(12) United States Patent
Eichhorst

(10) Patent No.: US 7,654,604 B2
(45) Date of Patent: Feb. 2, 2010

(54) VEHICLE DECKLID POSITION SENSOR AND CONTROL

(75) Inventor: Stefan Eichhorst, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 457 days.

(21) Appl. No.: 11/616,556

(22) Filed: Dec. 27, 2006

(65) Prior Publication Data

US 2008/0162003 A1 Jul. 3, 2008

(51) Int. Cl.
*B60J 7/20* (2006.01)

(52) U.S. Cl. ............... 296/107.08; 296/136.04; 296/136.06

(58) Field of Classification Search ............ 296/136.01, 296/136.03, 136.04, 136.05, 136.06, 107.08, 296/76

See application file for complete search history.

(56) References Cited

U.S. PATENT DOCUMENTS

| | | | |
|---|---|---|---|
| 2,770,489 A | 11/1956 | Garvey et al. | |
| 5,225,747 A | 7/1993 | Helms et al. | |
| 5,451,849 A | 9/1995 | Porter et al. | |
| 5,825,147 A | 10/1998 | Porter et al. | |
| 6,114,819 A | 9/2000 | Porter et al. | |
| 6,246,199 B1 | 6/2001 | Porter et al. | |
| 6,254,165 B1 * | 7/2001 | Neubrand | 296/76 |
| 6,288,511 B2 | 9/2001 | Porter et al. | |
| 6,832,804 B2 * | 12/2004 | Eichholz et al. | 296/107.08 |
| 2004/0017092 A1 * | 1/2004 | Antreich | 296/107.08 |

FOREIGN PATENT DOCUMENTS

| | | |
|---|---|---|
| DE | 3826789 A1 | 2/1990 |
| DE | 19845008 C2 | 5/1999 |

* cited by examiner

*Primary Examiner*—Patricia L Engle
(74) *Attorney, Agent, or Firm*—Gifford, Krass, Sprinkle, Anderson & Citkowski, P.C.

(57) ABSTRACT

A control system controls the movement of a convertible top, decklid, and tonneau cover to minimize the overall cycle time of the system. The top is pivotally coupled to a vehicle body for movement between an extended position covering a passenger compartment and a retracted position disposed in a storage space. The decklid is pivotally coupled to the body for movement between a closed position covering the storage space and an open position to accommodate movement of the top into the storage space. The tonneau cover moves between a use position extending outwardly from an end of the decklid to conceal the convertible top in the retracted position and a stowed position disposed beneath the decklid. The control system is preprogrammed to begin movement of the tonneau cover to the use position when the decklid reaches a predetermined angle as the decklid moves between the closed and open positions.

20 Claims, 6 Drawing Sheets

VEHICLE DECKLID POSITION SENSOR AND CONTROL

FIELD OF THE INVENTION

The invention relates to vehicles having convertible tops. More particularly, the invention relates to a sensor for detecting the position of a powered decklid and a control for coordinating movement of the decklid and a powered tonneau cover.

BACKGROUND OF THE INVENTION

Automotive vehicles with convertible tops typically include a storage space in which the top is stowed when fully retracted. The storage space is located behind the passenger compartment. The storage space may be a dedicated space used only for storing the retracted top, or the storage space may be continuous with or part of the trunk space. In either case, it is known to provide a decklid movable to a closed position for concealing the trunk and/or storage space. The decklid is pivotable in a forward direction allowing access to the trunk space and a rearward direction allowing movement of the top in and out of the storage space. A movable tonneau cover is typically used for concealing the top while retracted in the storage space. It remains desirable to provide a control system for coordinating simultaneous or overlapping movement of the decklid, tonneau and/or top so as to minimize the overall cycle time for the top as it moves between extended and retracted positions.

SUMMARY OF THE INVENTION

According to one aspect of the invention, a vehicle is provided which includes a body, a convertible top, a decklid, a tonneau cover, and a control system. The control system controls the movement of the convertible top, decklid, and tonneau cover. The body has a passenger compartment and a storage space. The convertible top is coupled to the body for movement between an extended position covering the passenger compartment and a retracted position disposed in the storage space. The decklid is coupled to the body for movement between a closed position covering the storage space and an open position to accommodate movement of the top into the storage space. The tonneau cover is coupled to the decklid for movement between a use position extending outwardly from an end of the decklid to conceal the convertible top in the retracted position when the decklid is in the closed position and a stowed position disposed beneath the decklid to accommodate the convertible top in the extended position when the decklid is in the closed position. The control system includes a position sensor that provides a position for the decklid. The control system is preprogrammed to begin movement of the tonneau cover to the use position when the decklid reaches a predetermined position between the closed and open positions.

According to aspect of the invention, a method is provided for controlling the movements of a decklid and a tonneau cover of a vehicle having a convertible top, wherein the decklid is movable between a closed position covering a storage space for storing the top when it is retracted and an open position allowing retraction of the top into the storage space, and the tonneau cover is movable between a use position extending outwardly from an end of the decklid to cover the top when retracted and a stowed position disposed beneath the decklid to accommodate the convertible top in the extended position when the decklid is in the closed position. The method includes the steps of: moving the decklid from the closed position toward the open position; determining the angular position of the decklid as it moves toward the open position; and moving the tonneau cover from the stowed position toward the use position when the decklid has reached a predetermined position between the closed and open positions.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 3:
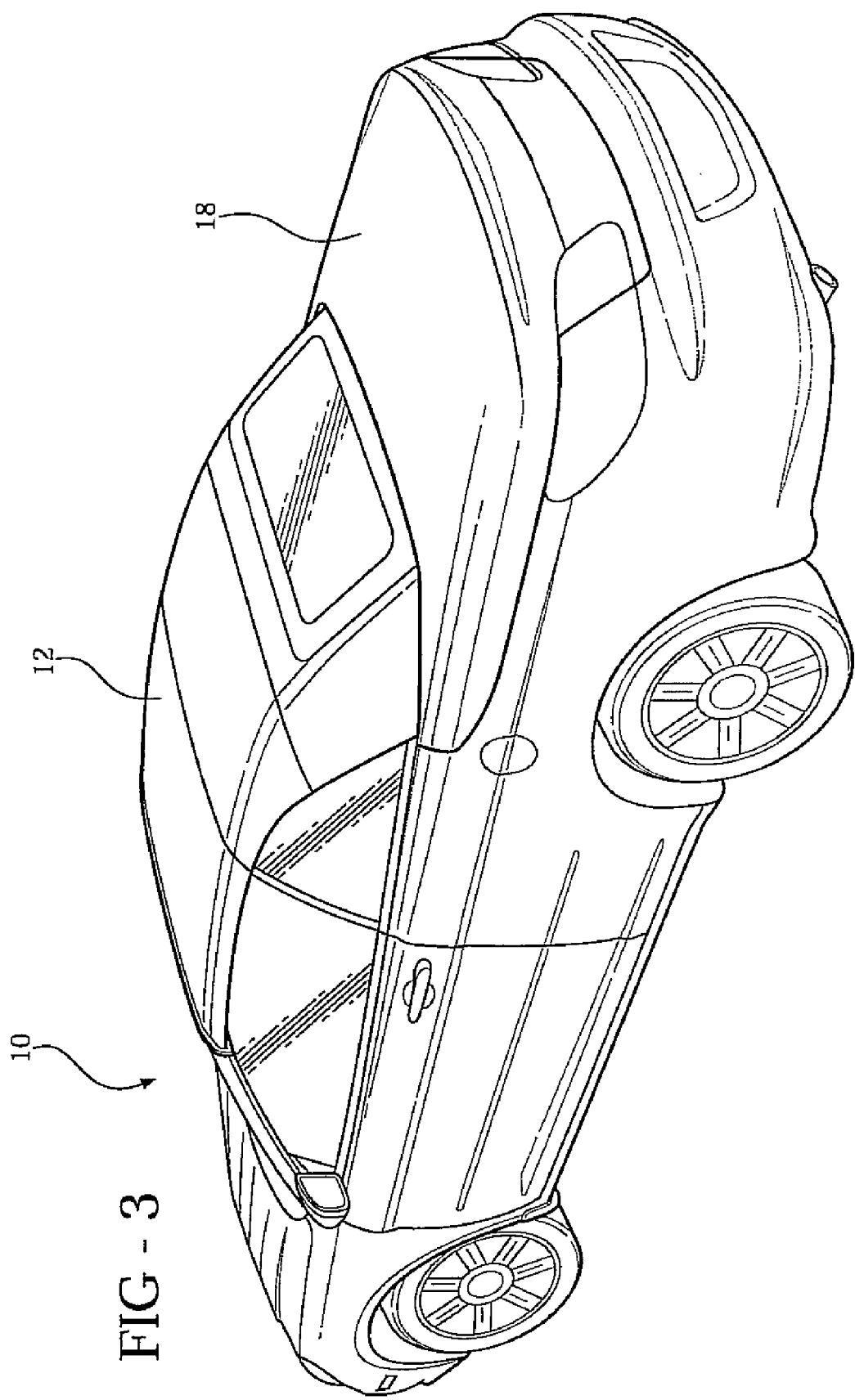
FIG. 3 is a rear perspective view of a vehicle with the convertible top in an extended position.
Figure 4:
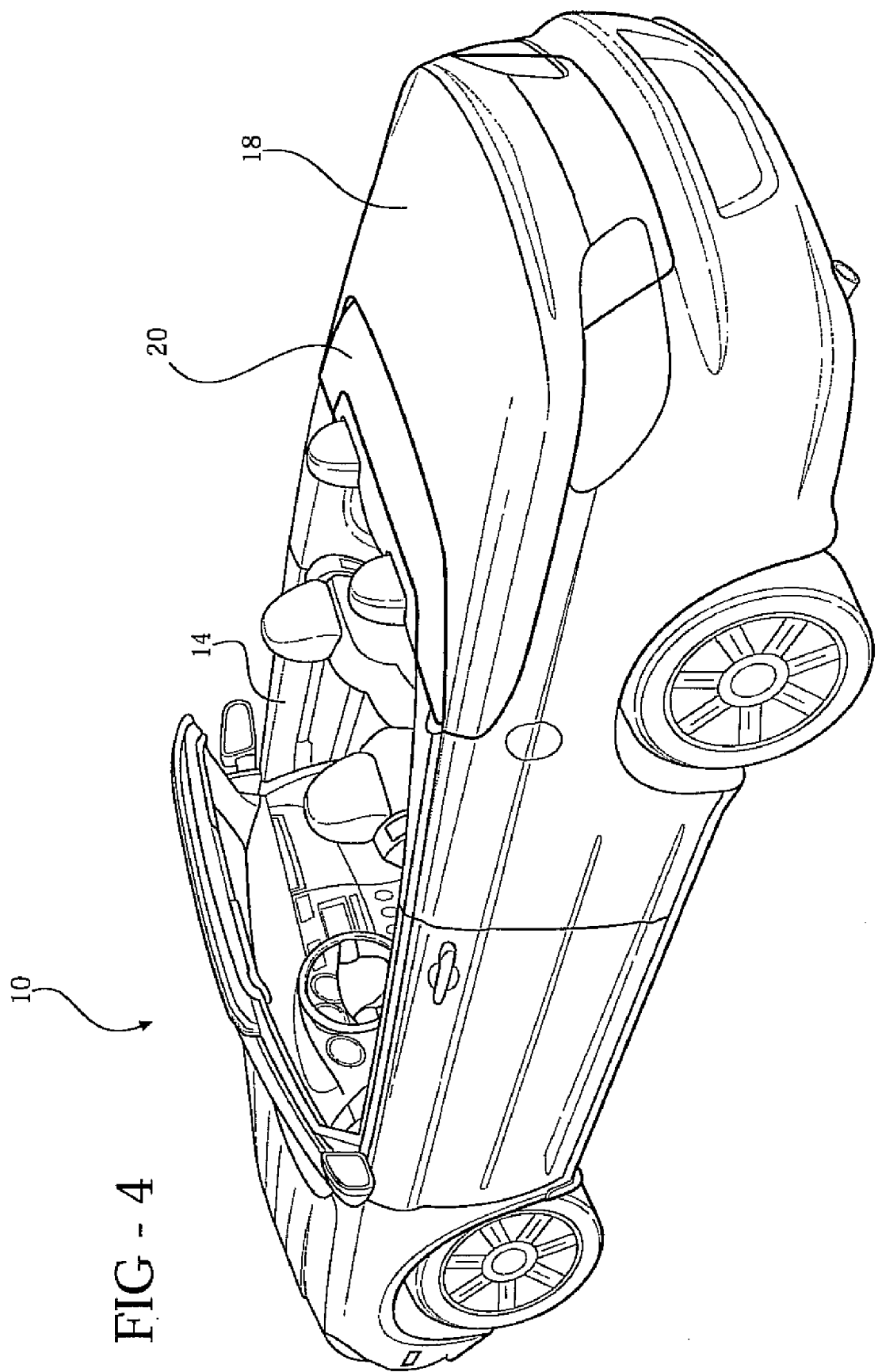
FIG. 4 is a rear perspective view of the vehicle with the convertible top in a retracted position.
Figure 5:
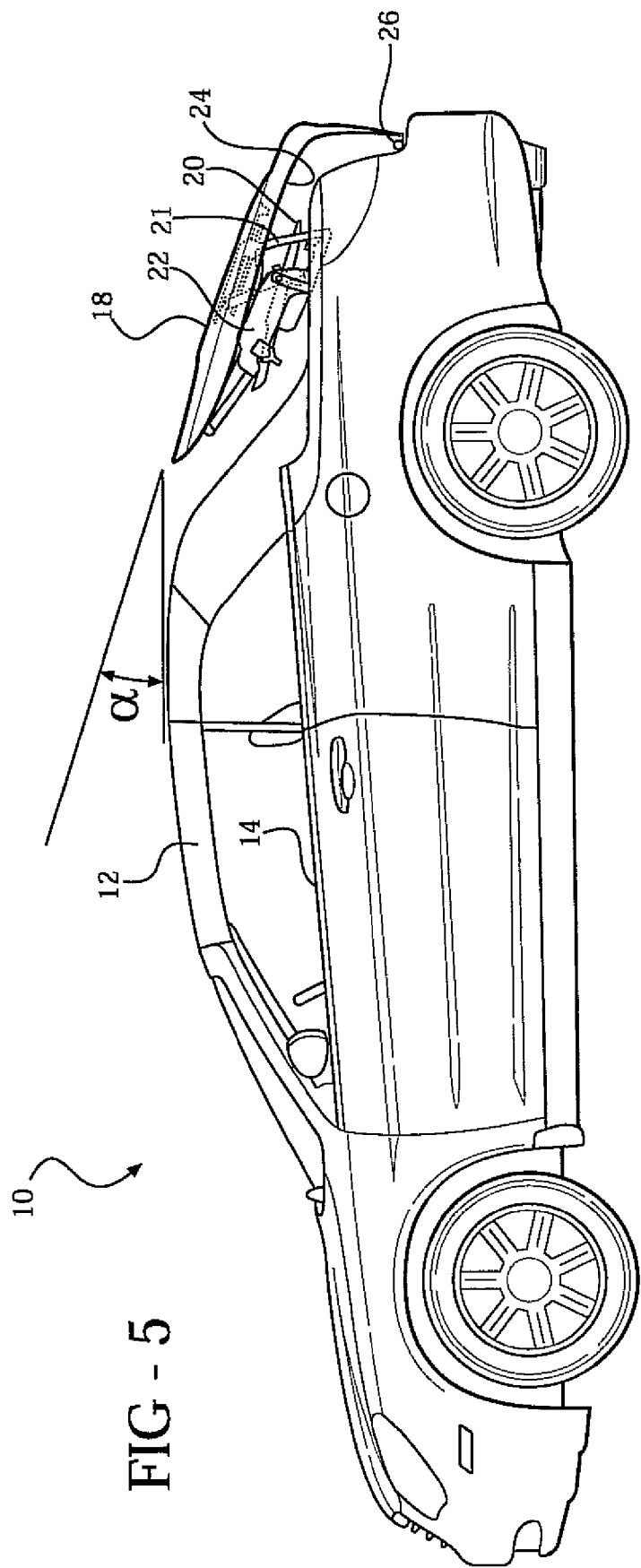
FIG. 5 is a side elevational view of the vehicle with the convertible top in the extended position and the decklid at a partially open position.
Figure 6:
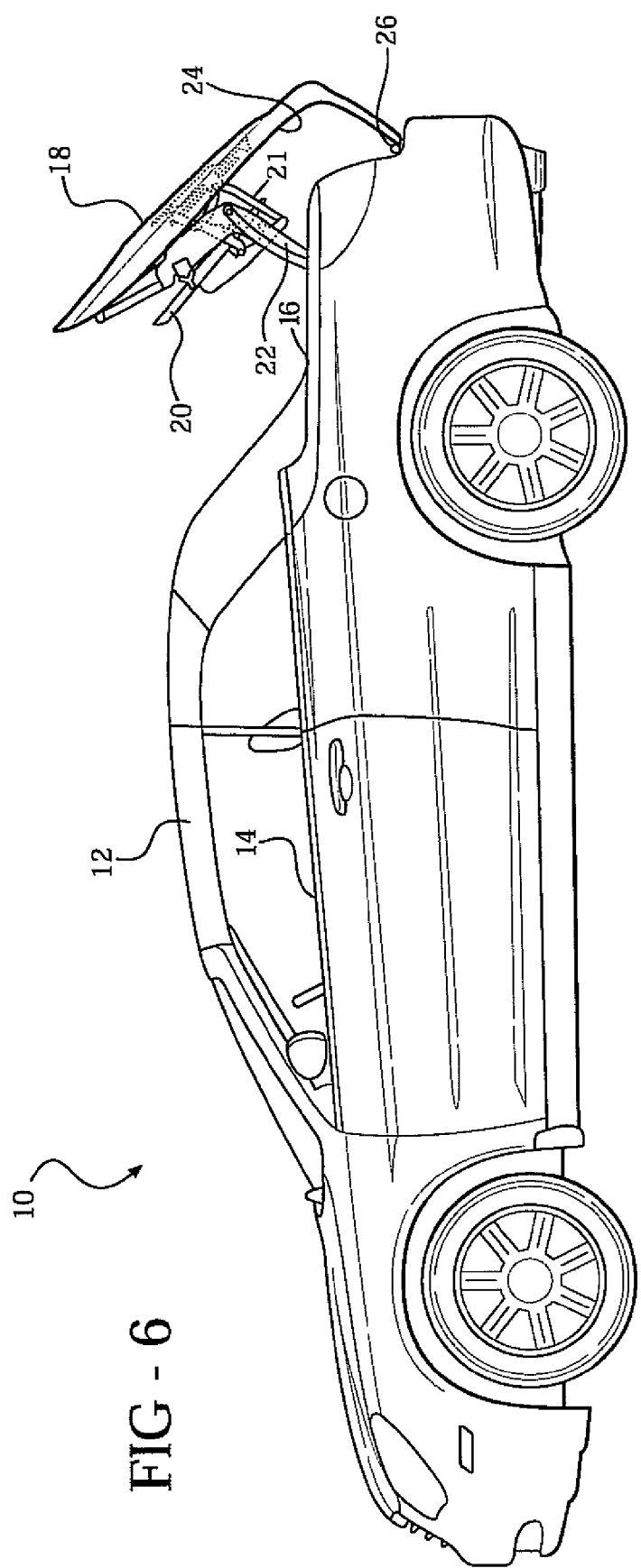
FIG. 6 is a side elevational view of the vehicle with the convertible top in the extended position and the decklid in the open position.
Figure 7:
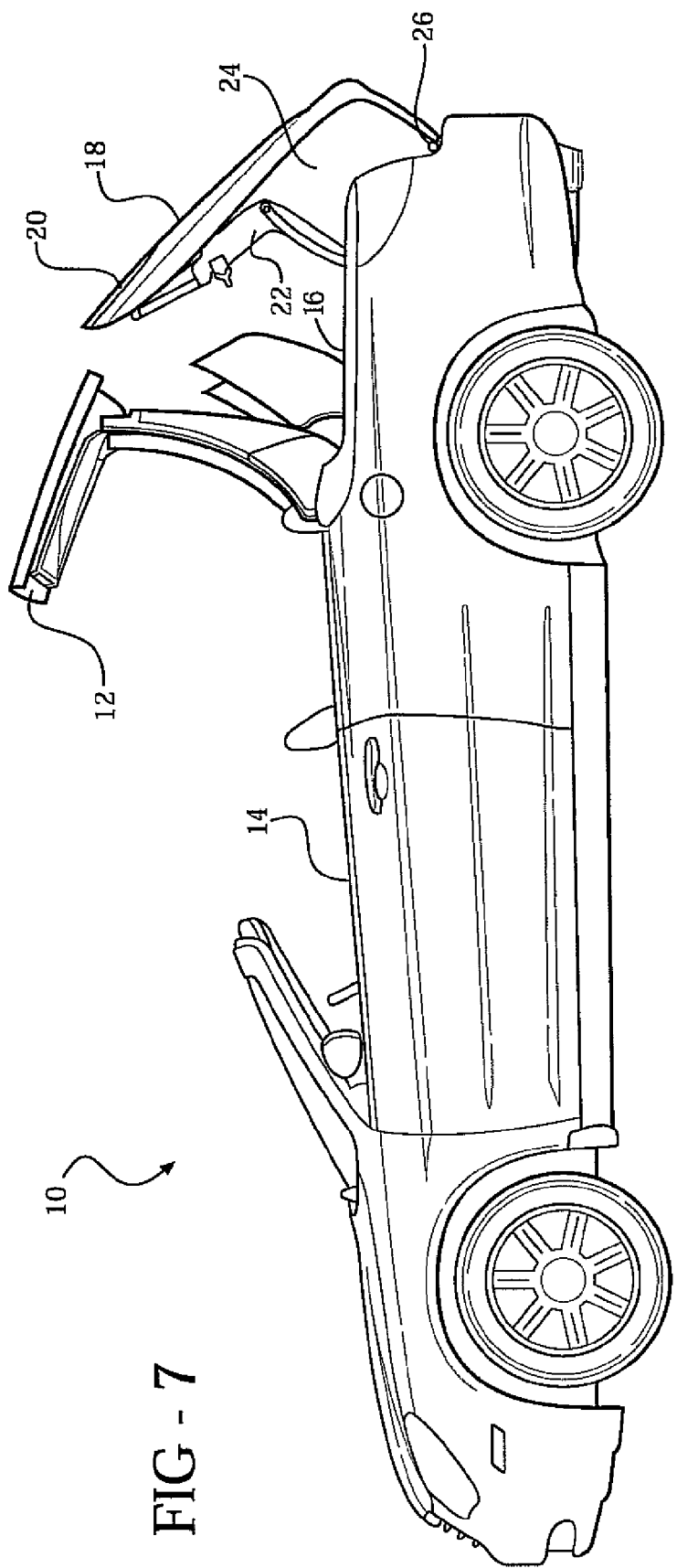
FIG. 7 is a side elevational view of the vehicle with the convertible top in an intermediate position between the extended and retracted positions and the decklid in the open position.

Referring to the FIGS. 3-7, a convertible vehicle is generally indicated at 10. The vehicle 10 includes a retractable top 12, a rear decklid 18 and a tonneau cover 20. The top 12 is pivotally coupled to the body of the vehicle 10 for movement between an extended position, as shown in FIG. 3, covering a passenger compartment 14 and a retracted position, as shown in FIG. 4, disposed in a storage space 16 located between the passenger compartment 14 and a rear end of the vehicle. The rear decklid 18 is pivotally coupled to the body of the vehicle 10 for movement between a closed position, as shown in FIGS. 3 and 4, and an open position, as shown in FIGS. 6 and 7. The tonneau cover 20 is pivotally coupled to the decklid 18 by a link mechanism 21 for movement relative to the decklid 18 between a use position and a stowed position. In the use position, as shown in FIGS. 4 and 7, the tonneau cover 20 extends outwardly from a front edge of the decklid 18 to cover the storage space 16 when the decklid 18 is in the closed position. In the stowed position, the tonneau cover 20 is disposed beneath the decklid 18 to accommodate the top 12 in the extended position. Intermediate positions of the tonneau cover 20 between the use and stowed positions are shown in FIGS. 5 and 6.

The decklid 18 is coupled to the vehicle by a linkage mechanism 22. In the illustrated embodiment, the linkage mechanism 22 includes a frame 24 pivotally coupled to the vehicle at a decklid pivot 26. The frame 24 supports the decklid 18 for movement between the closed and open positions about the decklid pivot 26. The decklid 18 is also pivotally coupled to the frame 24 for movement relative to the frame 24 between the closed position and a second open position (not shown) pivoted forwardly to allow access to the trunk from a rear end of trunk 16. Details of an illustrative linkage mechanism and its operation are provided in co-pending U.S. patent application Ser. No. 11/614,547, which is incorporated herein by reference in its entirety. As will be clear to those having ordinary skill in the art, other ways of movably interconnecting the top, decklid and tonneau cover to the vehicle may be used without departing from the scope of the present disclosure.

Figure 1:
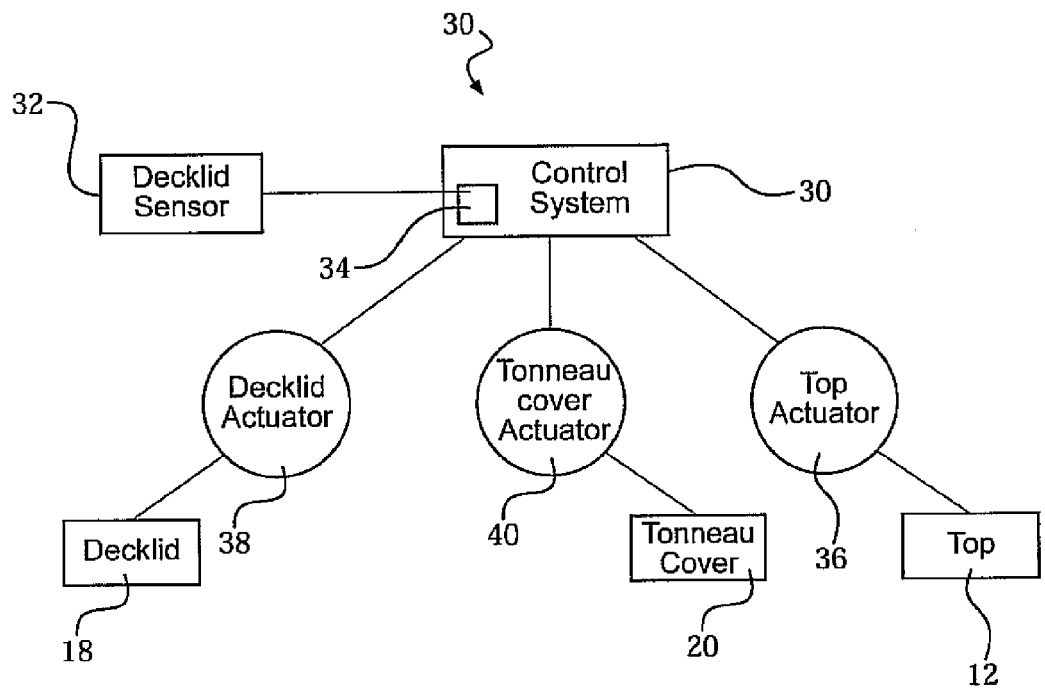
FIG. 1 is a schematic of a control system according to the invention for controlling the movement of a convertible top, decklid and tonneau cover.

As shown in the schematic of FIG. 1, the top 12, decklid 18 and tonneau cover 20 are driven by first 36, second 38, and third 40 actuators, respectively. Illustratively, hydraulic actuators may be used for driving the top, decklid and tonneau cover. It should, however, be readily appreciated that any type of actuator or combination of actuator types may be used to drive the top, decklid and tonneau cover. The vehicle 10 includes a control system 30 operatively coupled to the actuators 36, 38, 40 for coordinating the movements of the top 12, decklid 18 and tonneau cover 20 so as to provide a shortened overall cycle time for moving the top 12 between the extended and retracted positions. The control system 30 has a first sensor 32 that provides a signal indicating the position or angle of the decklid 18 relative to the vehicle body. The first sensor 32 may be positioned near or at the decklid pivot 26 to sense the angle of the decklid. The first sensor 32 may be a hall-type sensor, potentiometer or another type of sensor known by those having ordinary skill in the art. Further, the signal provided by the first sensor 32 may be provided continuously or discreetly at preselected points between the closed and open positions.

The control system 30 also includes a processor 34 that receives the signal from the first sensor 32 and is preprogrammed to correlate the signal with an angular position of the decklid 18. The processor 34 is also preprogrammed with an algorithm, illustrated by the chart in FIG. 2, that defines the instructions for controlling the operation of the actuators 36, 38, 40 generally in response to the signal from the first sensor 32.

Figure 2:
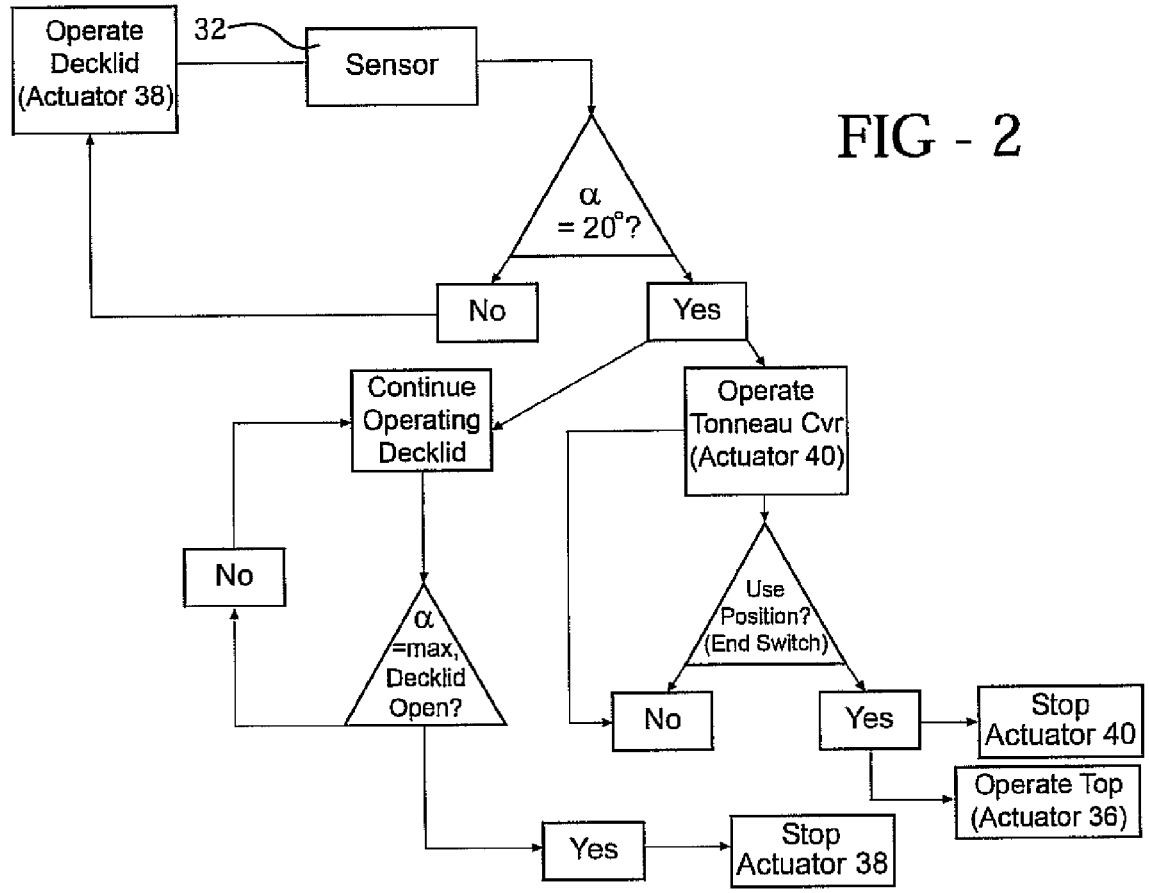
FIG. 2 is a schematic illustrating the logic used by the control system to control the movement of the convertible top, decklid and tonneau cover.

The operation of the system is now described with reference to the chart in FIG. 2 and beginning with FIG. 3, in which the top 12 is shown in the extended position, the decklid 18 is shown in the closed position and the tonneau cover is in the stowed position hidden below the decklid 18. The control system 30 triggers the second actuator 38 to begin moving the decklid 18 from the closed position toward the open position. During operation, the first sensor 32 provides a signal to the processor 34 indicating to the control system 30 the angular position of the decklid 18. When the decklid 18 reaches an angle α, the processor 34 begins operation of the third actuator 40 to move the tonneau cover 20 from the stowed position to the use position. The angle α is predetermined to ensure that the tonneau cover 20 does not interfere with the vehicle and/or the top as it moves to the use position. In the illustrated embodiment, the predetermined angle α is generally less than half of the total range of travel for the decklid 18 or about 20 degrees. Thus, the decklid 18 and the tonneau cover 20 move at the same time toward the respective open and use positions after the decklid 18 reaches the predetermined angle α. The overlapping movement of the decklid 18 and tonneau cover 20 reduces the overall cycle time of the system. An end position switch or second sensor may provide a signal to the processor 34 indicating the stowed and/or use positions of the tonneau cover 20. Once the decklid 18 is in the open position as indicated by the first sensor 32 and the tonneau cover 20 is in the use position as indicated by the second sensor, the control system 30 may operate the first actuator 36 to move the top 12 from the extended position toward the retracted position. The top 12 may be returned to the extended position by reversing the steps described above. It should be appreciated that the algorithm as illustrated herein may be arranged differently, may have fewer or more steps, and/or fewer or more inquiries than as shown without departing from the scope of the present disclosure.

Optionally, the decklid 18 may be designed to reach the open position before the tonneau cover 20 reaches the use position. In this case, the control system 30 may be programmed to operate the first actuator 36 to move the top 12 to the retracted position while the tonneau cover 20 is still moving toward the use position.

Optionally, the control system may be pre-programmed to determine when the decklid 18 is at a second predetermined angle, wherein it is safe to begin moving the top 12 to the retracted position without interference with the decklid IS and/or tonneau cover 20 as it continues to move toward the open position.

The invention has been described in an illustrative manner. It is, therefore, to be understood that the terminology used is intended to be in the nature of words of description rather than of limitation. Many modifications and variations of the invention are possible in light of the above teachings. For example, the term 'pivotally coupled' as described herein may include a single pivot or a multi-link arrangement. As another example, the top in the illustrated embodiment is a hard top, but may also be a soft top or a hybrid top. Thus, within the scope of the appended claims, the invention may be practiced other than as specifically described.

I claim:

1. A vehicle comprising:
   a body having a passenger compartment and a storage space;
   a convertible top coupled to the body for movement between an extended position covering the passenger compartment and a retracted position disposed in the storage space;
   a decklid coupled to the body for movement between a closed position covering the storage space and an open position to accommodate movement of the top into the storage space;
   a tonneau cover coupled to the decklid for movement between a use position extending outwardly from an end of the decklid to conceal the convertible top in the retracted position when the decklid is in the closed position and a stowed position disposed beneath the decklid to accommodate the convertible top in the extended position when the decklid is in the closed position; and
   a control system for controlling actuation of the convertible top, decklid and tonneau cover, the control system being preprogrammed to begin movement of the tonneau cover to the use position when the decklid reaches a predetermined position between the closed and open positions as the decklid moves from the closed position to the open position.

2. A vehicle comprising:
   a body having a passenger compartment and a storage space;
   a convertible top coupled to the body for movement between an extended position covering the passenger compartment and a retracted position disposed in the storage space;
   a decklid coupled to the body for movement between a closed position covering the storage space and an open position to accommodate movement of the top into the storage space;

a tonneau cover coupled to the decklid for movement between a use position extending outwardly from an end of the decklid to conceal the convertible top in the retracted position when the decklid is in the closed position and a stowed position disposed beneath the decklid to accommodate the convertible top in the extended position when the decklid is in the closed position; and a control system for controlling actuation of the convertible top, decklid and tonneau cover, the control system being preprogrammed to beam movement of the tonneau cover to the use position when the decklid reaches a predetermined position between the closed and open positions, the predetermined position being generally less than half of the distance between the closed and open positions.

3. A vehicle as set forth in claim 1, wherein the predetermined position is a predetermined angle of approximately twenty degrees.

4. A vehicle as set forth in claim 1, wherein the control system includes a position sensor that provides a signal indicating the angle of the decklid relative to the body, the position sensor being a hall-type sensor.

5. A vehicle as set forth in claim 4, wherein the control system includes a second position sensor that provides a signal indicating the position of the tonneau relative to the decklid.

6. A vehicle as set forth in claim 1, wherein the tonneau cover extends outwardly from a front end of the decklid to conceal the convertible top in the retracted position when the decklid is in the closed position.

7. A vehicle as set forth in claim 1, wherein the tonneau cover and decklid have outer surfaces that are substantially flush with each other when the tonneau cover is in the use position.

8. A vehicle as set forth in claim 1 wherein the tonneau cover and decklid are pivotally coupled to each other by a four-bar linkage for movement of the tonneau cover relative to the decklid between the use position and stowed position.

9. A vehicle as set forth in claim 1 including a frame pivotally coupled to the vehicle and supporting the decklid for movement between the closed position and a first open position tilted rearwardly in the vehicle to allow the top to move between the extended and retracted positions.

10. A vehicle as set forth in claim 9 wherein the decklid is pivotally coupled to the frame for movement between the closed position and a second open position tilted forwardly in the vehicle to allow access to the storage space from a rear end of the vehicle.

11. A vehicle as set forth in claim 1, wherein the control system is preprogrammed to begin movement of the tonneau cover to the use position when the decklid reaches a predetermined angle between the closed and open positions.

12. A vehicle as set forth in claim 1, wherein the convertible top is pivotally coupled to the body for movement between the extended and retracted positions.

13. A vehicle as set forth in claim 1, wherein the decklid is pivotally coupled to the body for movement between the closed and open positions.

14. A vehicle as set forth in claim 1, wherein the tonneau cover is pivotally coupled to the decklid for movement between the use and stowed positions.

15. A method of controlling the movements of a decklid and a tonneau cover of a vehicle having a convertible top, wherein the decklid is movable between a closed position covering a storage space for storing the top when it is retracted and an open position allowing retraction of the top into the storage space, and the tonneau cover is movable between a use position extending outwardly from an end of the decklid to cover the top when retracted and a stowed position disposed beneath the decklid to accommodate the convertible top in the extended position when the decklid is in the closed position, said method comprising the steps of:

moving the decklid from the closed position toward the open position;

determining the angular position of the decklid as it moves toward the open position; and moving the tonneau cover from the stowed position toward the use position when the decklid has reached a predetermined angle between the closed and open positions.

16. The method as set forth in claim 15 including the step of moving the tonneau cover from the stowed position toward the use position when the decklid has reached approximately twenty degrees of travel from the closed position.

17. The method as set forth in claim 15 including the step of moving the tonneau cover from the stowed position toward the use position before the decklid reaches a halfway point between the closed and open positions.

18. The method as set forth in claim 17 including the step of moving the tonneau cover to the stowed position prior to the decklid reaching the open position.

19. The method as set forth in claim 15 including the step of retracting the top toward the storage space when the decklid has reached a second predetermined angte so as to avoid interference during generally overlapping movement of the top and the decklid.

20. The method as set forth in claim 19 including the step of retracting the top toward the storage space before the tonneau cover reaches the use position.

* * * * *

UNITED STATES PATENT AND TRADEMARK OFFICE
CERTIFICATE OF CORRECTION

| | |
|---|---|
| PATENT NO. | : 7,654,604 B2 |
| APPLICATION NO. | : 11/616556 |
| DATED | : February 2, 2010 |
| INVENTOR(S) | : Stefan Eichhorst |

It is certified that error appears in the above-identified patent and that said Letters Patent is hereby corrected as shown below:

Column 1, line 57: Replace "to aspect" with --to another aspect--.

Column 2, line 39: Replace "to the FIGS." with --to FIGS.--.

Column 4, line 17: Replace "IS" with --18--.

Column 5, line 10 Claim 2: Replace "beam" with --begin--.

Column 6, line 43 Claim 19: Replace "angte" with --angle--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,654,604 B2 Page 1 of 1
APPLICATION NO. : 11/616556
DATED : February 2, 2010
INVENTOR(S) : Stefan Eichhorst It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Twenty-third Day of November, 2010

David J. Kappos
*Director of the United States Patent and Trademark Office*